(12) United States Patent
Cox

(10) Patent No.: US 9,530,132 B2
(45) Date of Patent: Dec. 27, 2016

(54) SYSTEM AND METHOD FOR CUSTOMER VIDEO AUTHENTICATION TO PREVENT IDENTITY THEFT

(76) Inventor: George Chester Cox, Greensboro, NC (US)

( * ) Notice: Subject to any disclaimer, the term of this patent is extended or adjusted under 35 U.S.C. 154(b) by 1268 days.

(21) Appl. No.: 10/765,544

(22) Filed: Jan. 27, 2004

(65) Prior Publication Data

US 2005/0165667 A1    Jul. 28, 2005

(51) Int. Cl.
| G06Q 20/40 | (2012.01) |
| G06Q 20/10 | (2012.01) |
| G06Q 20/20 | (2012.01) |
| G06Q 30/06 | (2012.01) |
| G06Q 40/00 | (2012.01) |
| G07F 7/02  | (2006.01) |

(52) U.S. Cl.
CPC .......... *G06Q 20/4014* (2013.01); *G06Q 20/10* (2013.01); *G06Q 20/20* (2013.01); *G06Q 20/4012* (2013.01); *G06Q 30/0603* (2013.01); *G06Q 40/00* (2013.01); *G07F 7/02* (2013.01)

(58) Field of Classification Search
CPC ................................................ G06Q 20/40145
USPC ................................................ 705/44, 64, 76
See application file for complete search history.

(56) References Cited

U.S. PATENT DOCUMENTS

| 5,878,155 | A  | * | 3/1999  | Heeter ........................... 382/115 |
| 6,045,039 | A  | * | 4/2000  | Stinson et al. ................. 235/379 |
| 6,072,894 | A  | * | 6/2000  | Payne ............................. 382/118 |
| 6,202,055 | B1 |   | 3/2001  | Houvener |
| 6,397,194 | B1 | * | 5/2002  | Houvener et al. .............. 705/16 |
| 6,424,249 | B1 | * | 7/2002  | Houvener .............. G06Q 20/04 340/5.8 |
| 6,513,015 | B2 |   | 1/2003  | Ogasawara |
| 6,529,881 | B2 |   | 3/2003  | Morganstein |
| 7,657,490 | B1 | * | 2/2010  | Nakajima ....................... 705/75 |
| 2001/0053239 | A1 | * | 12/2001 | Takhar ................. G06Q 20/341 382/124 |
| 2002/0091945 | A1 | * | 7/2002  | Ross ....................... G06F 21/33 726/21 |
| 2002/0138351 | A1 | * | 9/2002  | Houvener .............. G06Q 10/10 705/18 |

(Continued)

FOREIGN PATENT DOCUMENTS

WO    WO 03/077077    *    9/2003

OTHER PUBLICATIONS

U.S. Appl. No. 09/578,085.*

(Continued)

*Primary Examiner* — Susanna M Meinecke Diaz
(74) *Attorney, Agent, or Firm* — Winston & Strawn LLP

(57) ABSTRACT

A system for pre-authenticating a magnetic stripped card or smart card holder for a non-checking account transaction at the point-of-sale that includes a database that contains sensitive data, corresponding to digital photographic images of said account holders that employs a pre-authentication process whereby all account holders undergo a meticulous comparison with their submitted data and image against a plethora of objective public, private and internal databases and against a gallery of images, in that order, culminating in a video displayed image at some point in the future enabling a merchant to make a visual comparison of the account holder either on site or during a mail order or telephone order transaction corresponding to the pre-authenticated image to prevent identity theft.

18 Claims, 12 Drawing Sheets

(56) References Cited

U.S. PATENT DOCUMENTS

| | | | | |
|---|---|---|---|---|
| 2003/0056113 A1* | 3/2003 | Korosec | ................ | G06Q 20/04 |
| | | | | 726/28 |
| 2004/0024709 A1* | 2/2004 | Yu | ....................... | G06Q 20/105 |
| | | | | 705/43 |
| 2004/0213437 A1* | 10/2004 | Howard | ............ | G06F 17/30011 |
| | | | | 382/115 |
| 2009/0319353 A1* | 12/2009 | Palmeri | ................. | G06Q 20/20 |
| | | | | 705/14.17 |

OTHER PUBLICATIONS

Frye, B.A., Michelle C. "The Body as a Password: Considerations, Uses, and Concerns of Biometric Technologies." A Thesis Submitted to the Faculty of the Graduate School of Arts and Sciences of Georgetown University in partial fulfillment of the requirements for the degree of Master of Arts in Communication, Culture and Technology, Apr. 27, 2001.*

* cited by examiner

SYSTEM AND METHOD FOR CUSTOMER VIDEO AUTHENTICATION TO PREVENT IDENTITY THEFT

BACKGROUND OF THE INVENTION

Thieves obtain the information they need to commit identity theft by finding it in computerized public databases; looking through dumpsters for bank deposit slips; pre-approved credit card offers; or other discarded documents; stealing one's wallet or purse; stealing one's mail directly out of one's mailbox; or gaining access to sensitive information through their relationship with their employer and perhaps selling it out into the open market if they become abruptly discharged; or even bribing or smooth talking employees of companies who have access to customer or personal records.

Thieves also use camera phones to snap pictures of cardholders names, account numbers, and expiration dates. They can also obtain one's credit report directly from a credit bureau by posing as an employer, loan officer, or landlord. Information on one's credit report includes their social security number and a list of their credit cards and their numbers.

At the time of this filing there were 9.9 million Americans who fell victim to identity theft because someone illegally used their credit card numbers; applied for an account in their name; or otherwise misused their personal information. These cases cost banks, businesses and credit card companies $48 Billion in losses, and cost each consumer victim an average of $500.00. Stolen credit cards, which thieves use to make extravagant purchases, cost banks $1 Billion annually in and of themselves. Victims of the most serious cases of identity theft, those involving new accounts, spent an average of $1,180.00 and 60 hours trying to fix the problem. Overall, a victim spends on average 175 total hours over a two year period, to regain their financial health. It may take some victims up to fours years to resolve.

Merchant's also realize higher rates of chargebacks due to identity theft. A chargeback is a consumer dispute that, under certain circumstances, may be charged to a merchant. Many merchants' profit margins are very slim. Multiple chargebacks can result in a higher chargeback fee to merchant's by acquirers, as well as increased insurance premiums, slower or halted accounts receivables, as well as overall increases in transaction costs along the value chain starting with acquiring banks and ultimately passed onto consumers. Multiple chargebacks can also force merchant's to go out of business. That being the case, then the acquirer must make good on the transaction despite the absence of the merchant, thereby generating a loss. These issues affect merchant brick-n-mortar as well as internet merchant businesses including auctions.

Current attempts to stave off, what the FBI has labeled as America's fastest growing crime—identity theft, have all but failed. Examples include smart cards, the $50.00 limit of liability, photos on credit cards, or even fingerprint technology.

The problem with smart cards is that it costs 5 to 10 times the cost to produce one smart card compared to a magnetic stripe card. There is also no logistical support in place to capture or store embedded biometric data. That is perhaps the biggest hurdle. The next largest concern is that there is no customer or merchant acceptance. This is evidenced in the trial market run back in 1988 on New York's upper west side. The card's acceptance failed miserably. Moreover, the smart card has been broken into. (See NY Times 6-10-98)

But beyond all of the above, the underlying problem of identity theft still exists. That is to say, that once a thief puts their hands on a victims social security number, date of birth, full name, address, or telephone number then that will still allow them to steal a card holder's good name and use it for bad purposes despite the smart cards embedded biometric data. By opening a new account the data will simply reflect the thief's biometric data thereby legitimizing the fraudulent transaction.

The problem with the $50.00 limit of liability is that it works only for lost or stolen credit cards, and that presupposes a cardholder reacts within 48 hours. The billing cycle for credit card statements is usually 25-30 days. If a thief has a cardholder's card number then the victim will not typically react until they receive their bill. Then, once a cardholder does react they must complete a dispute form in writing within 30 days then forward it by mail or courier to their card issuer. The card issuer is mandated to respond within 10 business days for resolution of errors. The card issuer then credits the account and conducts an investigation that must be concluded within 45 days after receipt of the notice from the cardholder. If no error occurred, the issuer has 3 business days to explain its conclusion by delivery or mail. It is apparent that this reactionary product has a rather time consuming and paper driven expense, possibly as along as 181 days. Ultimately, the card issuer's shareholders absorb the loss. Moreover, the bigger problem still looms. A theft may still have the cardholder's social security number, address, date of birth, etc. and may still open up new accounts in the victim's name even after the credit card is reported lost or stolen. Also it should be noted that this product does not extend to debit cards. A victim's savings or checking accounts could be wiped out if their debit account number is used fraudulently.

The problem with photos on credit cards is a simple one. Does the reader currently have a photo on their credit card? Debit card? Oil or department store card, or travel and entertainment card? The inventor's point is made. It should also be noted that there have been attempts to place photos on some cards, but they (a) are not ubiquitous, and more importantly (b) can easily be manipulated and re-laminated because they are card dependent security features.

The problem with fingerprint technology is that this technology was born out of the need to provide customer identification to cash checks in retail outlets outside of the check holder's area. The problem is that many privacy groups, like the ACLU, and others are in opposition to this practice. Some worry that the more intrusive fingerprint, is being used to intimidate people who patronize businesses that serve lower income people where check cashing is the only option instead of a bank account. There has also been evidence that someone was successful in placing a jelly like substance on their thumb to masquerade or fool the machine with a fingerprint other than their own.

Telephone fraud and utilities fraud cost the communication industries along with electric and gas companies over $4 Billion annually in the United States. These costs are ultimately passed onto consumers. The most common is subscription fraud. This type of fraud occurs when a subscriber signs up for a service with fraudulently obtained customer information or false identification without any intention of paying for service.

In summary all of the prior art fall short because they are (1) not ubiquitously found, and (2) are card dependent features that lend themselves to the potential for reverse engineering by sophisticated criminals, and (3) most importantly are reactionary and not preventive at the time of the transaction. A method of data processing for financial, business practices, management or cost/price determinations requiring authorization or authentication pursuant to 705/44 would solve the foregoing problems and disadvantages to financial institutions, merchants, and ultimately consumers while stabilizing financial credit markets.

The present invention addresses disadvantages and problems associated with previous products, systems, and methods to prevent identity theft.

Accordingly, the central objective of the present invention is prevention. Past attempts to solve the problem of identity theft are all reactionary products, systems, or methods.

The problem with zero liability policies is that it only applies to U.S. issued credit cards. It also only applies to one particular multi-use brand thereby leaving the other three main multi-use brand cards vulnerable. Furthermore, it is purely voluntary. It does not apply to commercial cards or to PIN transactions not processed by the products originator. Finally, and most importantly, if a thief has a victim's name, address, social security account number, or date of birth (DOB), that may be enough to continue to allow a thief to open up new lines of credit in other financial arenas.

The problem with the $50.00 limit of liability is that it too is reactionary. Moreover, it does not extend to debit accounts. It is highly labor and paper driven intensive. It also may drag out as long as 181 days for a resolution. Finally, and most importantly, the main problem still exists. That is too say that if a thief has a victim's sensitive info, then new lines of credit may still be opened.

The problem with total protection is that it is a card dependent product. It is only available to the originator's check card customers. Thereby leaving other customers vulnerable. The vulnerability also extends to other card issuer's customers. Furthermore it does not protect debit account holders. Finally, the overall problem still looms regarding victim's sensitive information as previously noted.

The problem with photo ID's is that legally a merchant may not ask for a customer's ID as part of their regular card acceptance procedures, either when a valid card is first presented, or to complete a sale. This is outlined in all merchant agreement contracts with the provider. Laws in several states throughout the U.S. also make it illegal for merchant's to write a cardholder's sensitive information such as an address, or phone number, on a sales receipt.

The problem with credit card verification (CCV) is that once thieves gain access to a victim's card then they simply turn the card over on it's back and reveal the CCV four digit code. This allows thieves to perform fraudulent purchases over the telephone. Much like other products, this one is also card dependent and therefore is inherently a failure.

All of the above products give consumers the illusion of protection against identity theft, but a macro look reveals that consumers lose in the end. Here is how: Despite the front end illusion, once identity theft transpires then card issuers are obligated to re-credit the consumer's account during the dispute phase. At that point merchant's who once enjoyed a credit, now endures a debit in the merchant's reserve bank account until resolution. This is called a merchant chargeback. Many merchants have slim profit margins. Multiple chargebacks result in higher transactions fees set by the merchant's acquiring banks. If merchants go out of business due to increased transactions fees particularly stemming from a higher activity of chargebacks that all equate to slower accounts receivables, as well as an increase in lost inventory, then acquirers must absorb the loss. Acquirers pass those expenses onto other merchants and card issuers along the value chain for whom they perform transactions processes. Those expenses in the form of higher transactions fees are ultimately passed back to consumers in form of higher prices.

Other problems with existing products also adversely affect banker's blanket insurance premiums, credit risk models, bank reserve requirements to cover loans associated with extending credit, as well as shareholder value for all entities along the value chain.

On a final managerial note it should be appreciated that business' including card issuers, all experience quality costs at different stages. The four stages become more costly as a business fails to implement a strategy to reduce or eliminate these costs.

The first stage is the prevention cost or research and development stage. At this stage training of personal, evaluation of potential suppliers, improving materials, as well as improving equipment and processes are found at this stage. The disclosure embodied in this filing is comprised at this stage.

The second stage is the appraisal cost or detection of poor quality services stage. At this stage inspection of incoming credit applications, inspections of various stages of credit approval, inspection of the initial cardholders, and also product testing that might include clerks at the POS.

The third stage is the internal failure costs or production stage. Production loss is caused by downtime as in the case of a filed dispute. Reworks, scraped, rejected product units, as well as disposal of rejected units all make up this stage and add to an increase in costs relative to the two foregoing stages.

The fourth and final stage is the costliest. External failure or customer service or opportunity costs stage is found here. This final stage is where all the reactionary products previously discussed are located. Loss profits from lost customers, warranty or guarantee costs, service costs at customer sites, as in the case of initiating an investigation at a merchant's site once a dispute is filed, sales return and allowances due to fraudulent transactions, and also product liabilities, are all characteristics found in the last stage.

SUMMARY

The system and method embodied in this disclosure is found in stage one and specifically as it relates to improved equipment and processes. The current invention includes a database containing pre-authenticated non-checking accounts numbers that correspond to a pre-authenticated digital facial image of the primary and/or secondary account holders that culminate by being displayed at the time of transaction and at the POS for a visual comparison by the merchant or merchant's agent.

Transactions include card present as well as card not present or mail order/telephone order (MOTO) transactions as well as other transactions requiring verifiable credit histories. Account holder's visages are either displayed at a computer monitor or video phone during card not present or MOTO transactions.

The pre-authenticated process relies on back-end public, private, and internal databases comparative processes that act on SQL fields of name, address, BIN numbers, and other key fields to determine if the individual is who they say they are—or if they are an imposter.

The pre-authenticated process also relies on a back-end facial recognition software driven database, whereupon the submitted image is matched against the existing internal database.

In closing, the present invention therefore improves prevention by being card independent and ubiquitous. By pre-capturing sensitive data and images to be displayed sometimes in the future lends strongly to the preventive objective of the embodiment. It will serve to protect merchants, consumers, shareholders, financial institutions, Government, private companies who extend credit and services based on verifiable credit histories. On a final note the current invention will also stabilize financial credit markets each time a customer interacts with the embodied disclosure.

It should be noted that the current invention distinguishes it's features and advantages from those described in U.S. Pat. No. 6,202,055 issued to Houvener, et al on Mar. 13, 2001 whereas the system and method contained herein will (1) disclose mail order and telephone order (MOTO) card transaction authentication. (2) Back-end authentication processes beyond just image and account associations. (3) It has taken into consideration that merchant's or their agents accountability to input or key in identifier specific data of a customer at the point of sale is both (i) very time consuming for other customers in a highly dynamic and fast paced environment while in the check-out line and (ii) inherently allows for human error during that fast paced environment as well as (iii) allows for human favoritism as in an example of a merchant or a merchant's agent working in collaboration with a criminal and so therefore does not allow for an arms length authenticated process. (4) The current invention will also disclose that sensitive data is captured and collected by a secure internet website, postal mail, courier, facsimile, telephone, telephony, or any other communication means other than the POS. (5) The current invention will disclose that digital images are captured via web camera, digital camera, camera phone, picture messaging, internet protocol camera, watch camera, or any other digital photographic capturing equipment other than a CMOS scanner earlier than the transaction (emphasis supplied). (6) The current invention is also distinguished from the prior art in that digital images are captured at a significantly earlier point in time and NOT at the point of sale. (7) The current invention also does not employ a scanner. (8) The current invention also does not employ a supervisory sign on requirement to capture identifier specific data. (9) The same holds true for an electronic software key input by a merchant or their agent to facilitate authentication. (10) The current invention also is distinguished from the prior art in that it categorically does not perform identity verification for personal checks or company checks. The current invention considers that personal data on personal checks inherently lends itself to compromises and is therefore self defeating to prevent identity theft. It is not advocated. (11) Furthermore the current invention does not employ the time consumption of transmission along with the processor overhead of compression and encryption as well as decompression and decryption. (12) The current invention also does not "pass through" a card authorization code through the system and considers that only an authorized automated clearing house by law has exclusive privy to grant and manipulate said code. (13) The current invention requires that all card transactions be put through the system and method for video authentication to be displayed at the POS each and every time. Conversely the prior art employs an optional verification standard, provided a transaction record previously captured, which may be recalled at a later date should be questioned. This concept of questioning a transaction's authenticity by definition and on it's face, demonstrates an optional and non-ubiquitous transaction and is therefore distinguishable. (14) The current invention also does not send a series of images at the POS during one transaction. (15) Finally, and most importantly the current invention does not employ scanning a photographic image supplied by the card holder from a driver's license, passport, or other photo card at the POS. (i) The current invention considers that such photo cards are card dependent features and (ii) lend themselves to manipulation, relamination, as well as an unobjective means of securing such cards in the absence of back-end authentication processes. In other words sophisticated criminals have been know to posses false driver's licenses, passports, and other photo cards. The requirement to scan a customer supplied photo card is inherently unstable and lies at the vertex of the prior art and therefore the means significantly differ as does the overall function of the prior art from the embodiment disclosed below.

One such system that will be disclosed herein contains particular reference to a POS system, where a multi-use credit or debit card is presented, or an oil or department store or retail store card is presented, or a travel and entertainment card is presented by a card holder in order to make a purchase or other magnetic stripped cards or smart cards. Thus the system will make particular references to credit or debit card account numbers or non-checking account numbers.

BRIEF DESCRIPTION OF THE SEVERAL VIEWS OF THE DRAWINGS

For a more complete understanding of the present invention and for further features and advantages thereof, reference is now made to the following descriptions taken in conjunction with the accompanying drawings in which.

DETAILED DESCRIPTION

Figure 1:
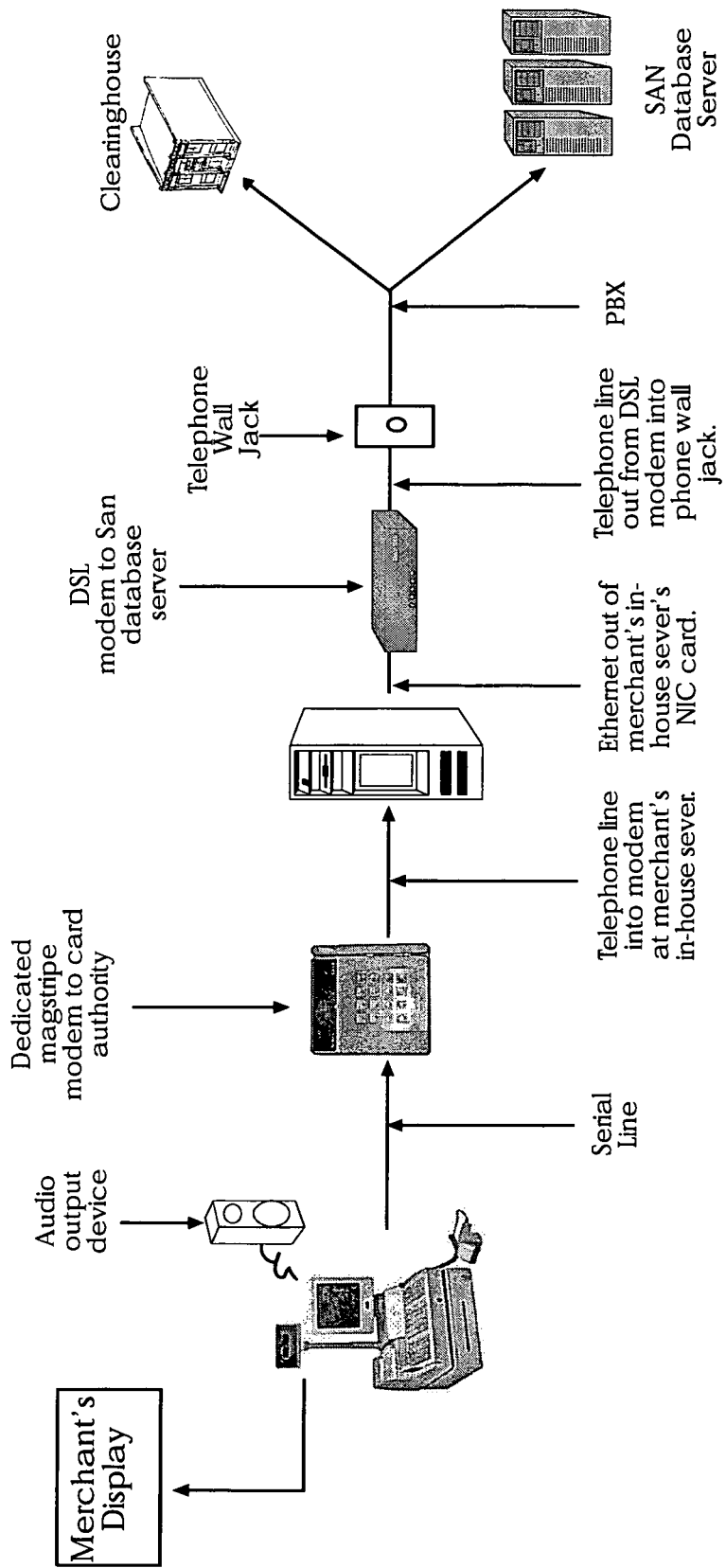
FIG. 1 illustrates a system for authenticating a customer and returning a video Image in a full duplex environment with a DSL modem.
Figure 2:
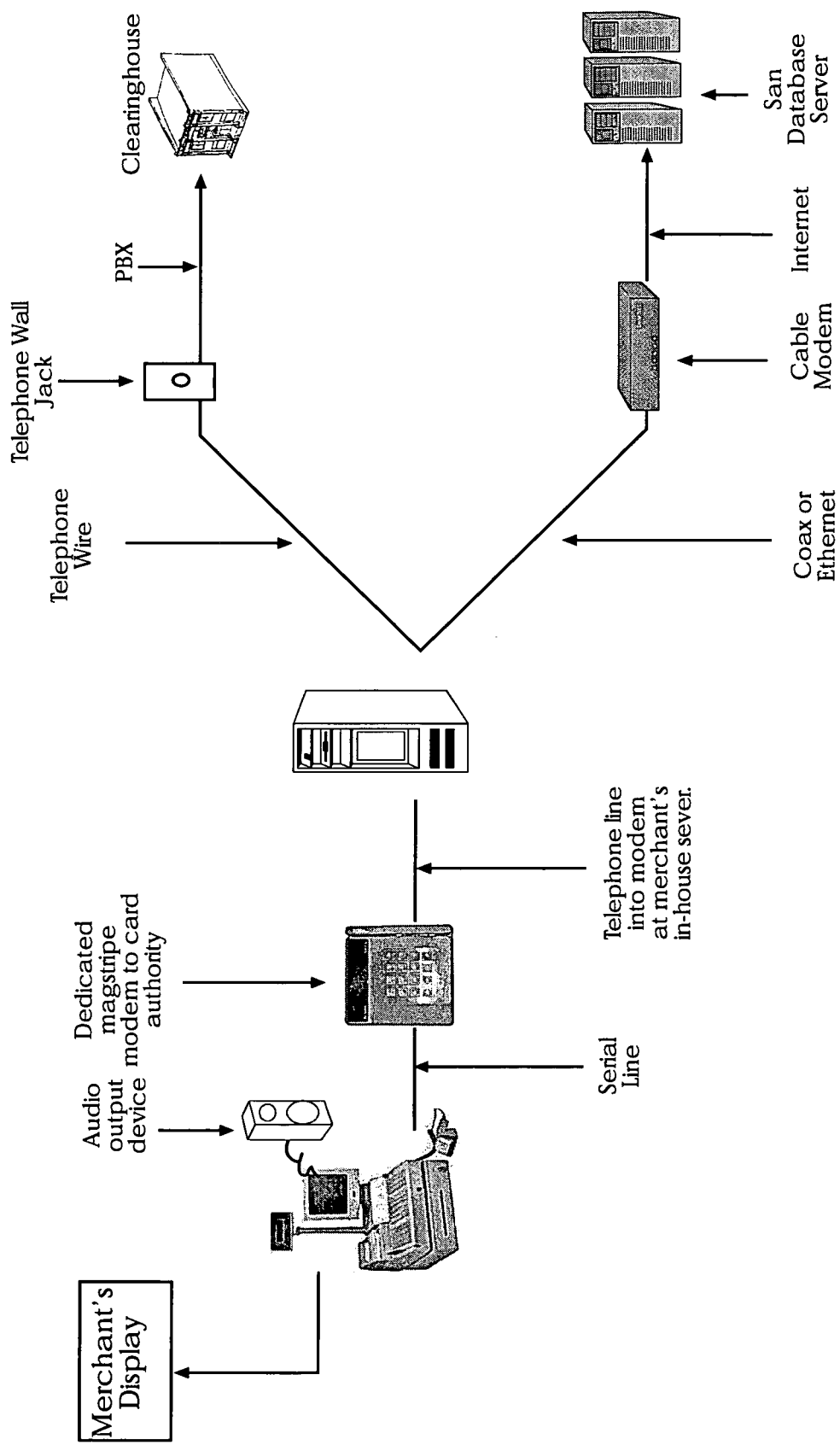
FIG. 2 illustrates a system for authenticating a customer and returning a video Image in a full duplex environment with a cable modem.
Figure 3:
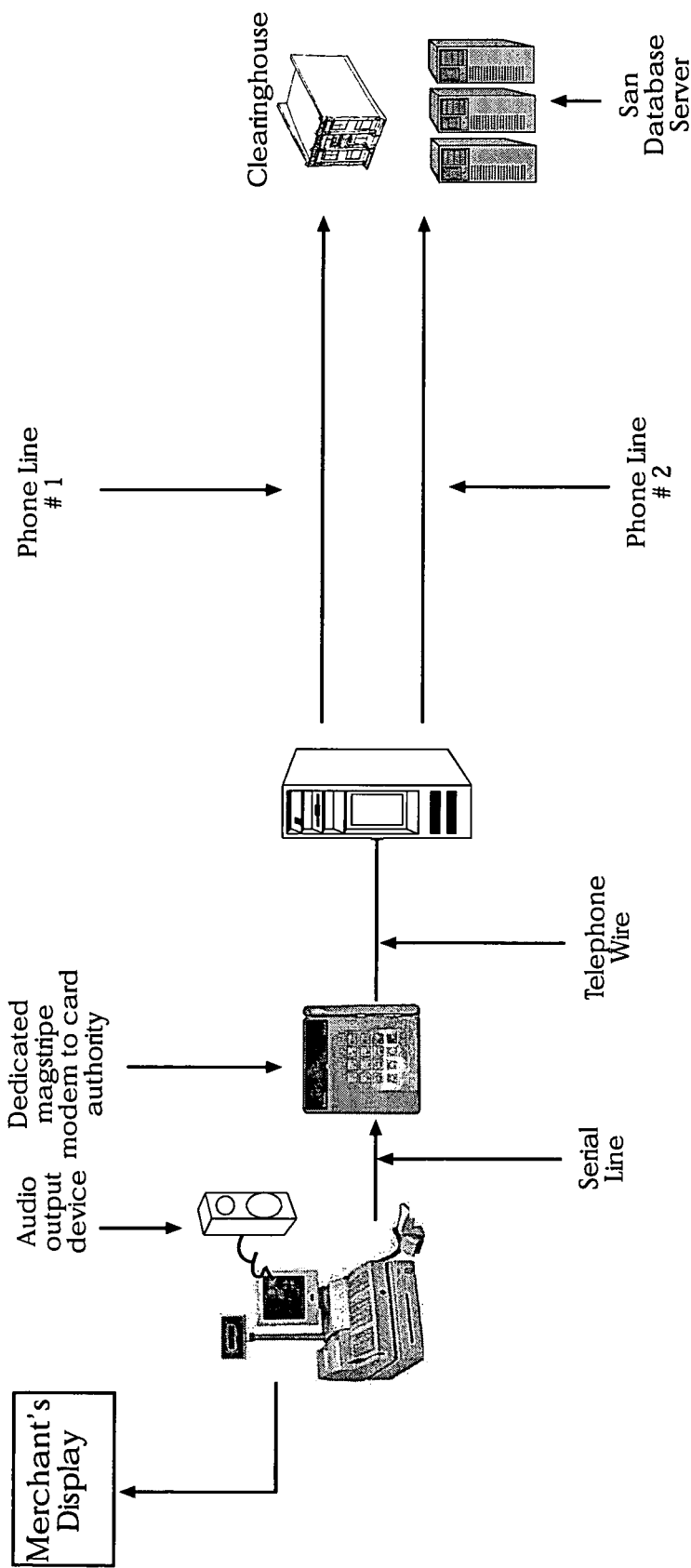
FIG. 3 illustrates a system for authenticating a customer and returning a video Image in a full duplex environment with two telephone lines and two Telephone numbers.
Figure 4:
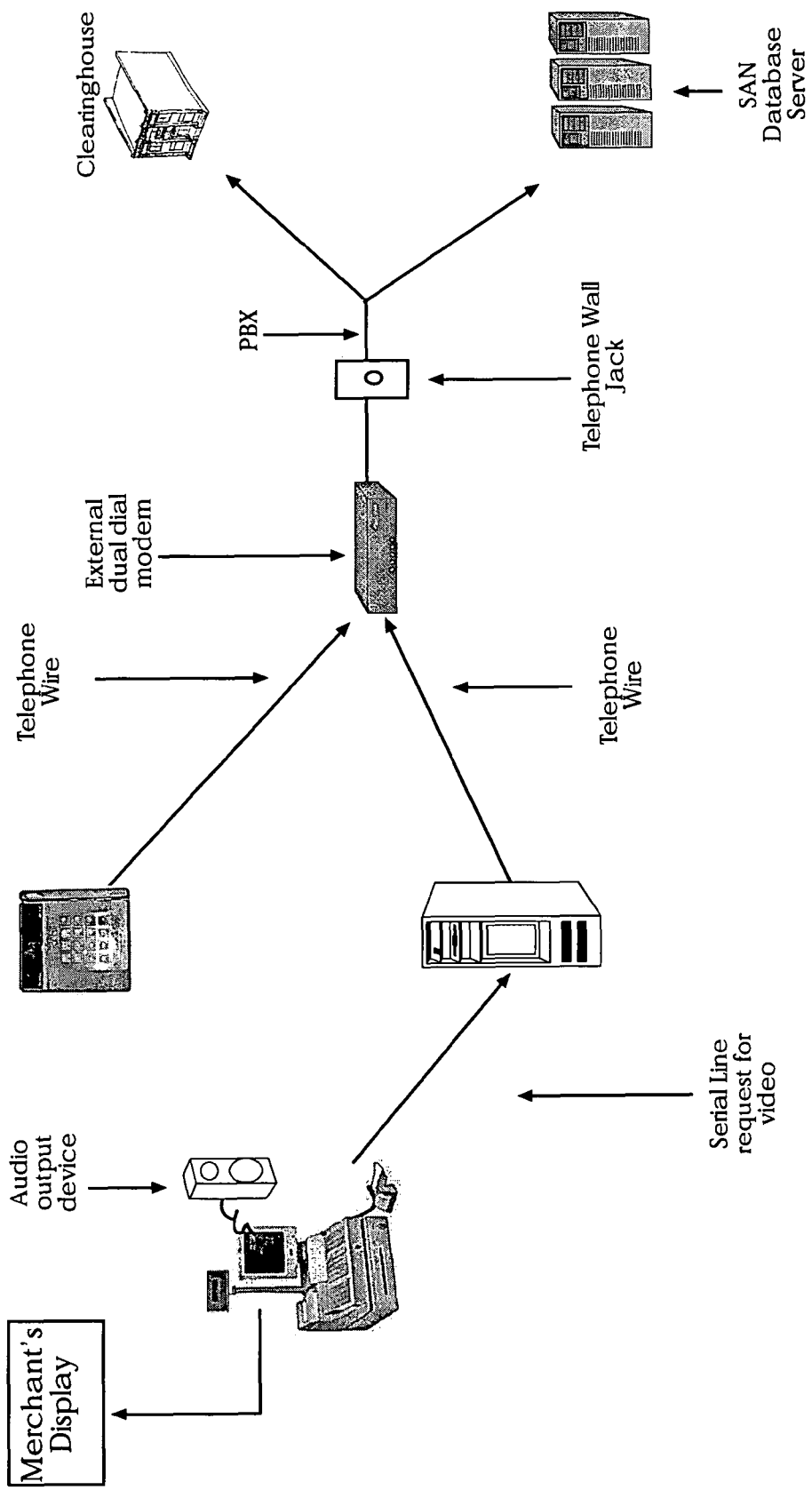
FIG. 4 illustrates a system for authenticating a customer and returning a video Image in a full duplex environment with a dual dial modem.
Figure 5:
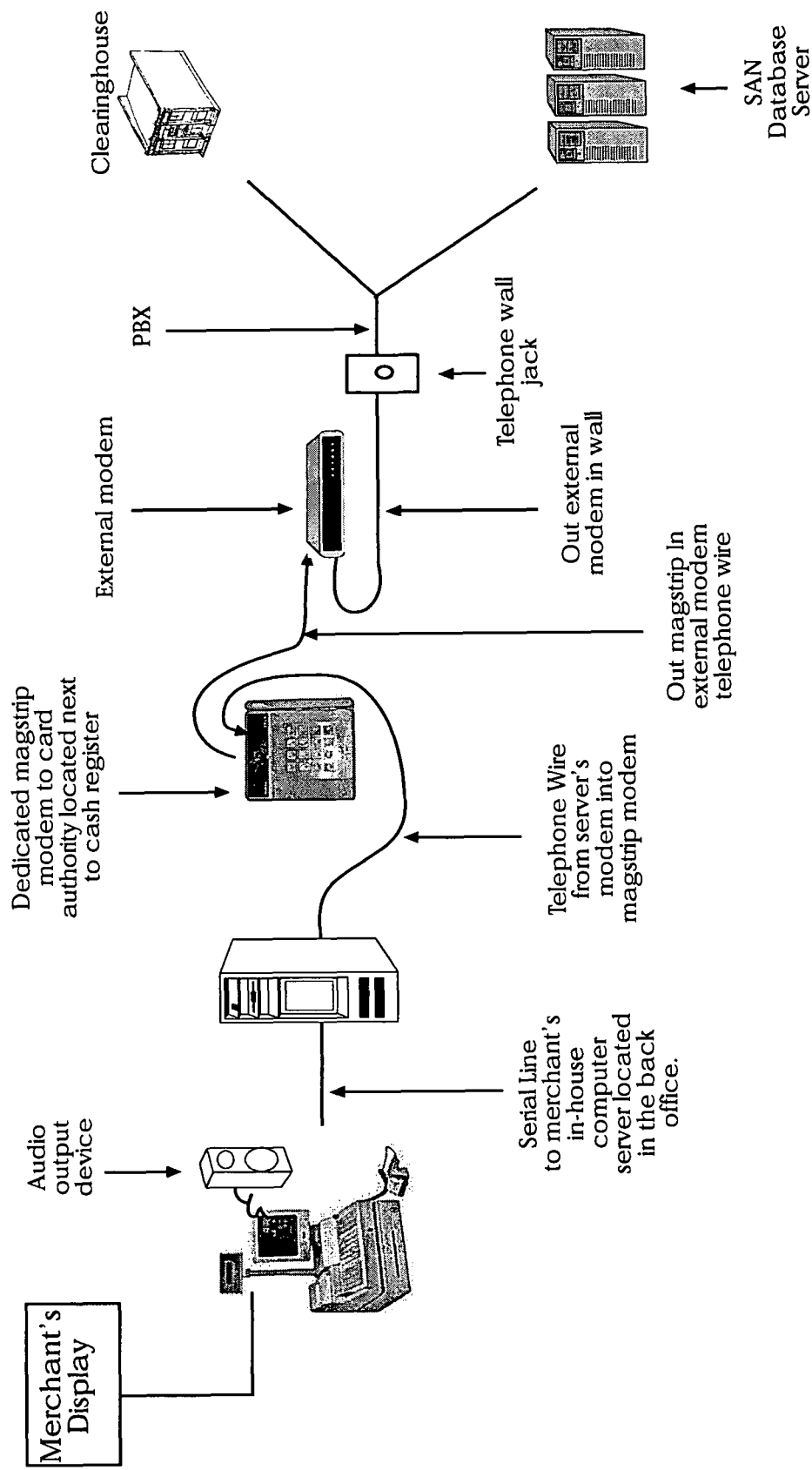
FIG. 5 illustrates a system for authenticating a customer and returning a video Image in a full duplex environment with three modems that are daisy Chained where at least one is the magstripe terminal.
Figure 6:
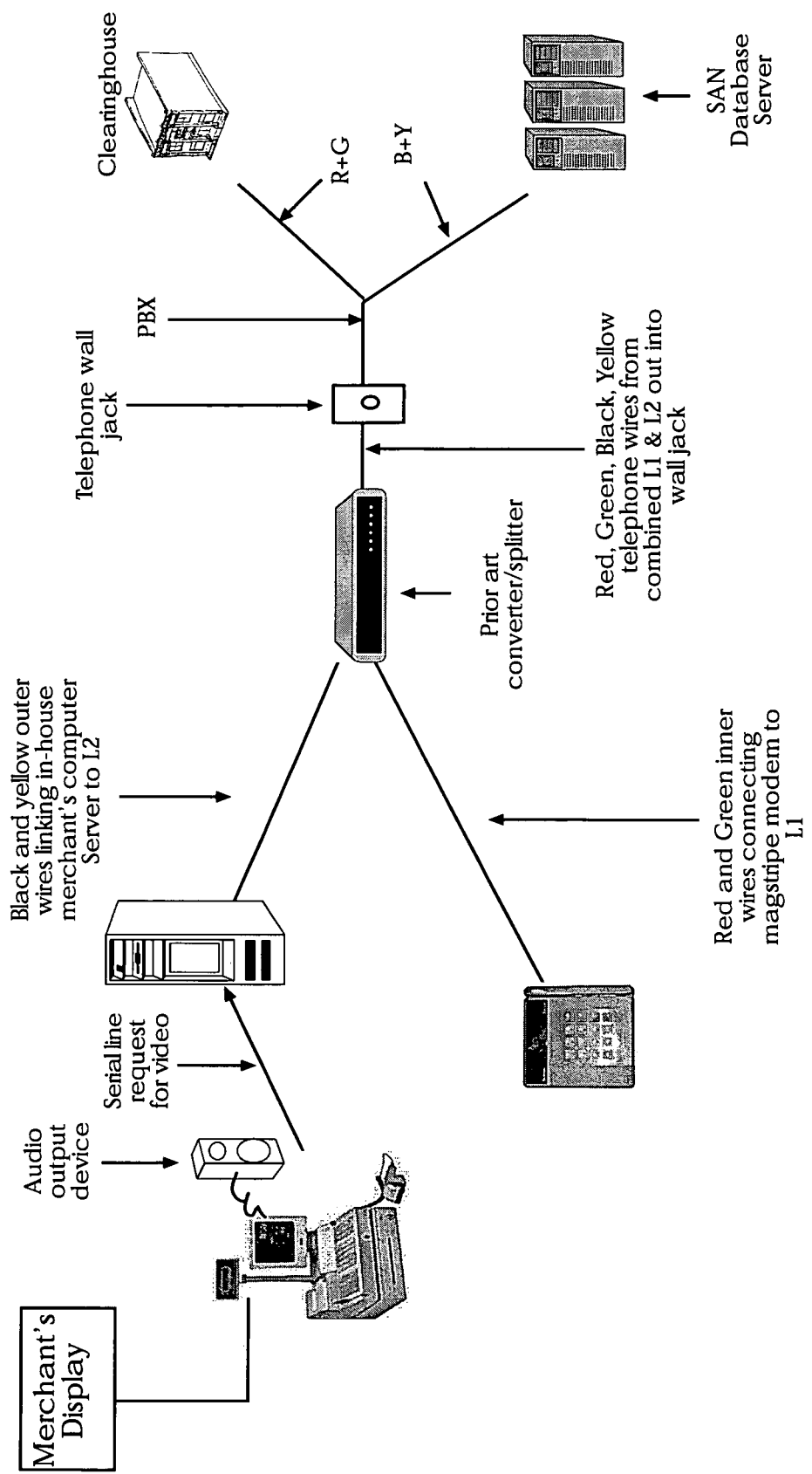
FIG. 6 illustrates a system for authenticating a customer and returning a video Image in a full duplex environment of said customer where the red and Green inner wires from the magstripe modem are separated from the Black and yellow outer wires from the merchant's in-house computer Server. All four wires are then united with a splitter/converter Thereby enabling full duplex and concurrent requests to the clearinghouse and SAN databases respectively.
Figure 7:
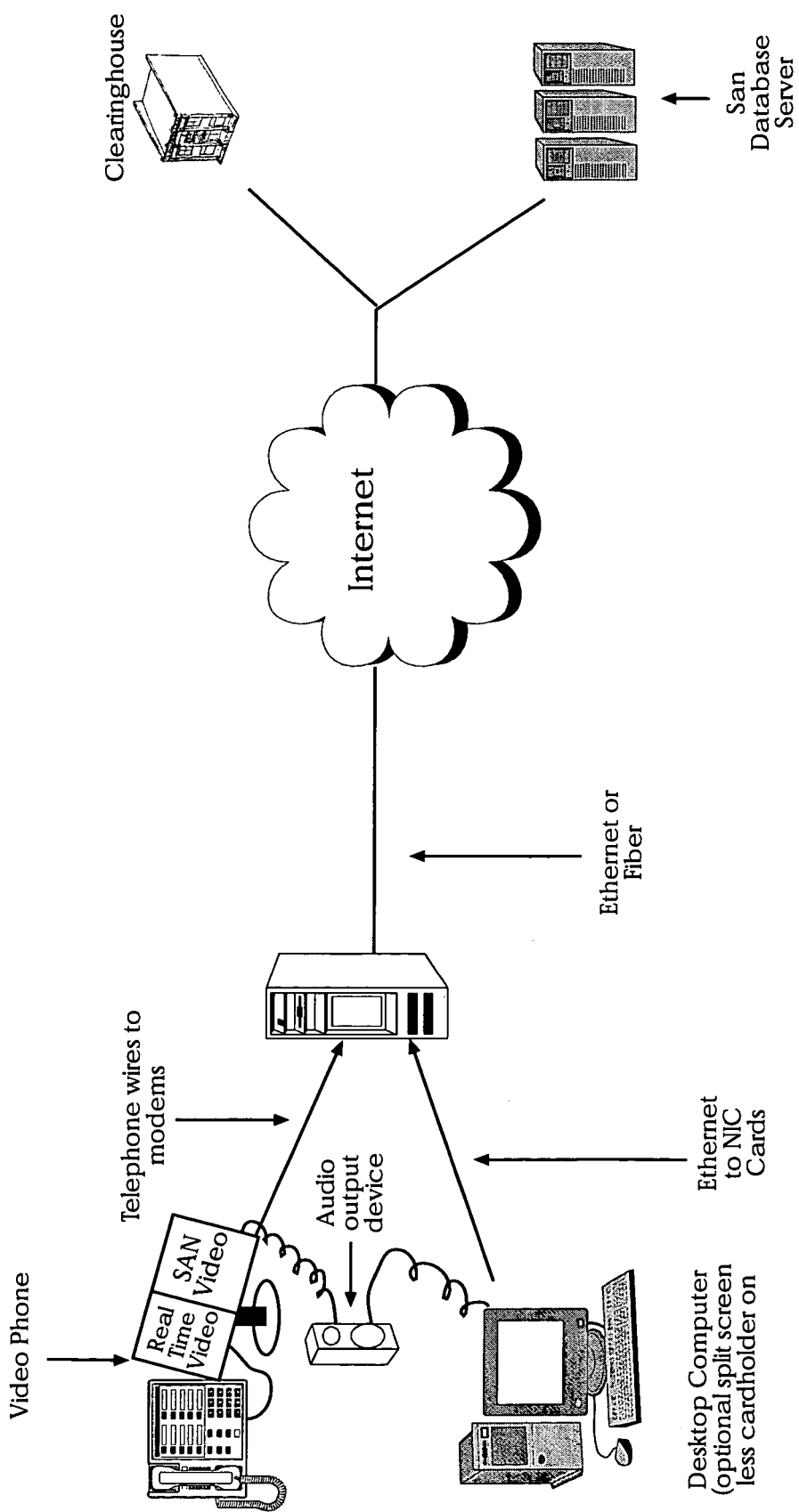
FIG. 7 illustrates a system for authenticating a customer and returning a Video image in a full duplex environment for card not present/MOTO Transactions by way of the internet or over a videophone.
Figure 8:
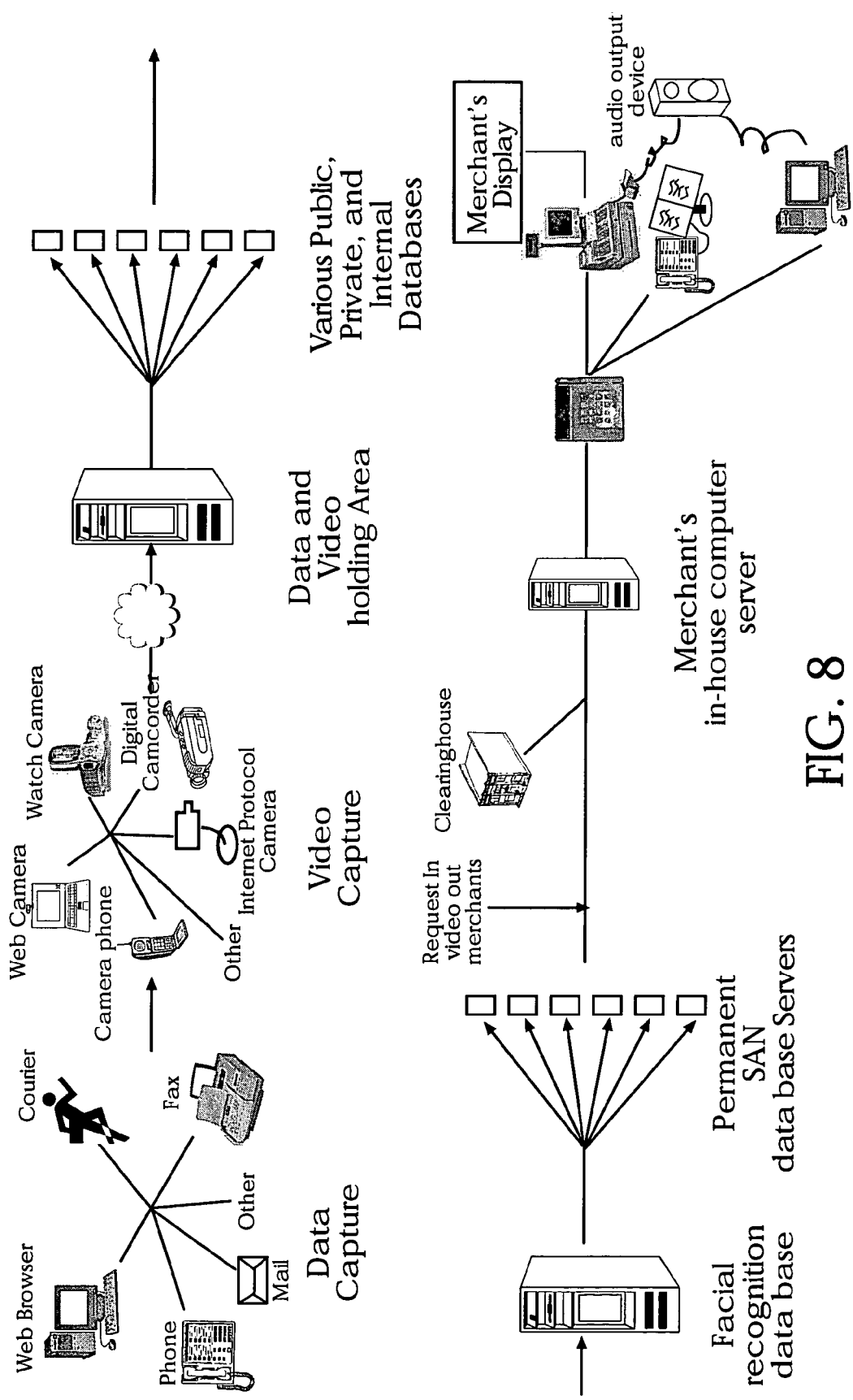
FIG. 8 illustrates the entire system for authenticating a customer that Comprises the steps of data capture, video capture, temporary data And video holding staging area, followed by the various dedicated Public, private, and internal databases that comprise the pre-authentic cation backend methodology and processes. The facial recognition Database server is then illustrated followed by the permanent SAN Database servers leading to a full duplex environment between the Merchant's in-house computer server that is linked at the magstripe Modem terminal culminating in various display methods for merchant Video image comparisons at the POS.
Figure 9A:
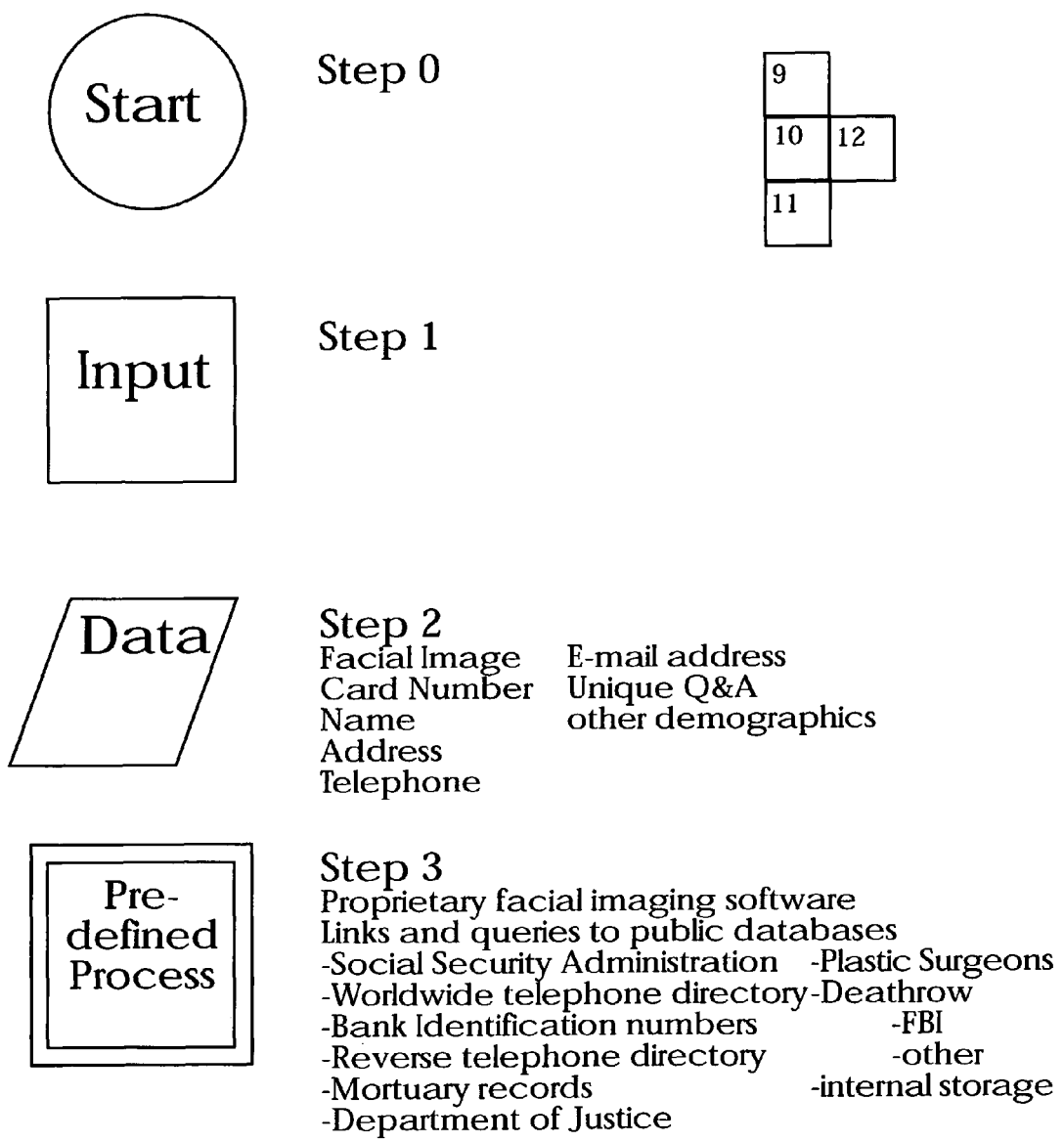
FIG. 9a, 9b, 9c, 9d are a flow chart illustrating a method and process of Authenticating a customer.
Figure 9B:
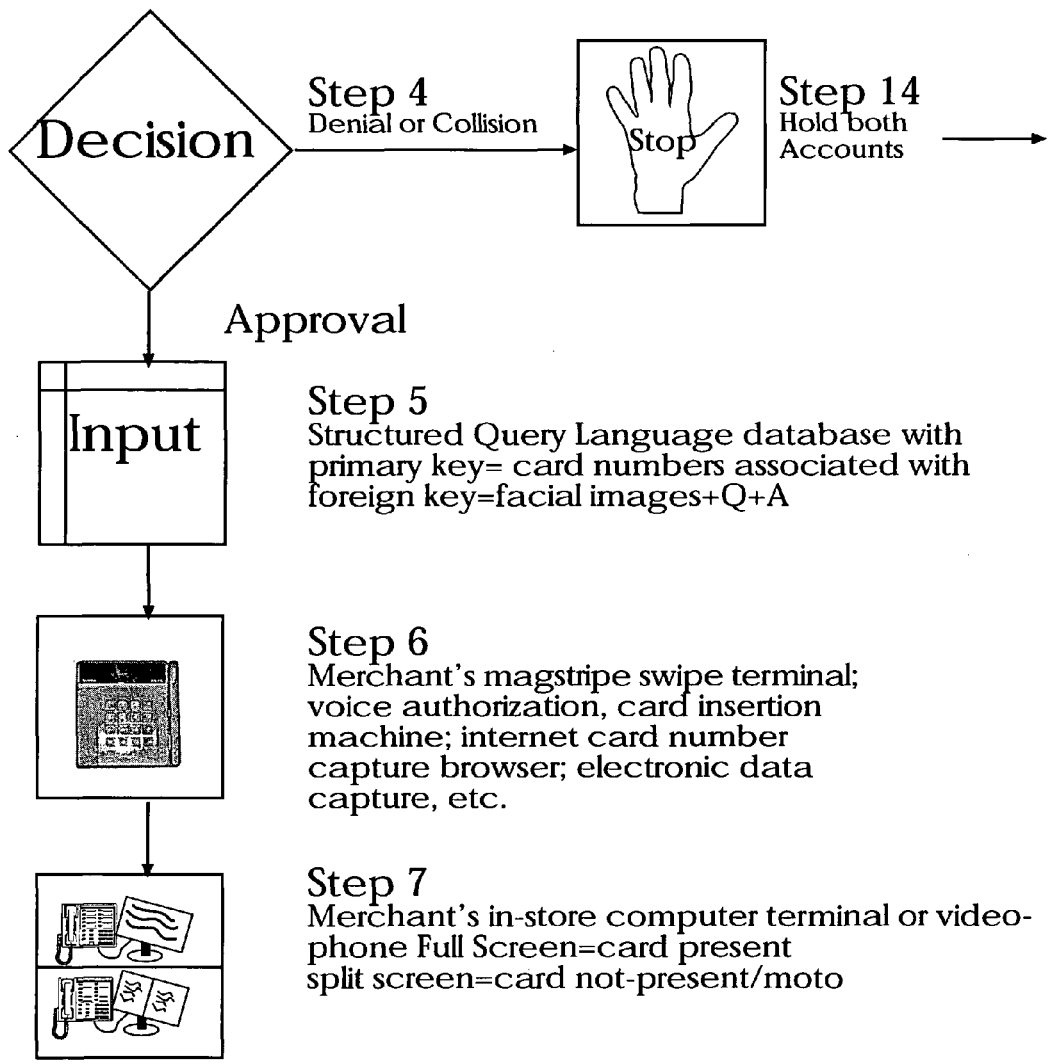
Figure 9C:
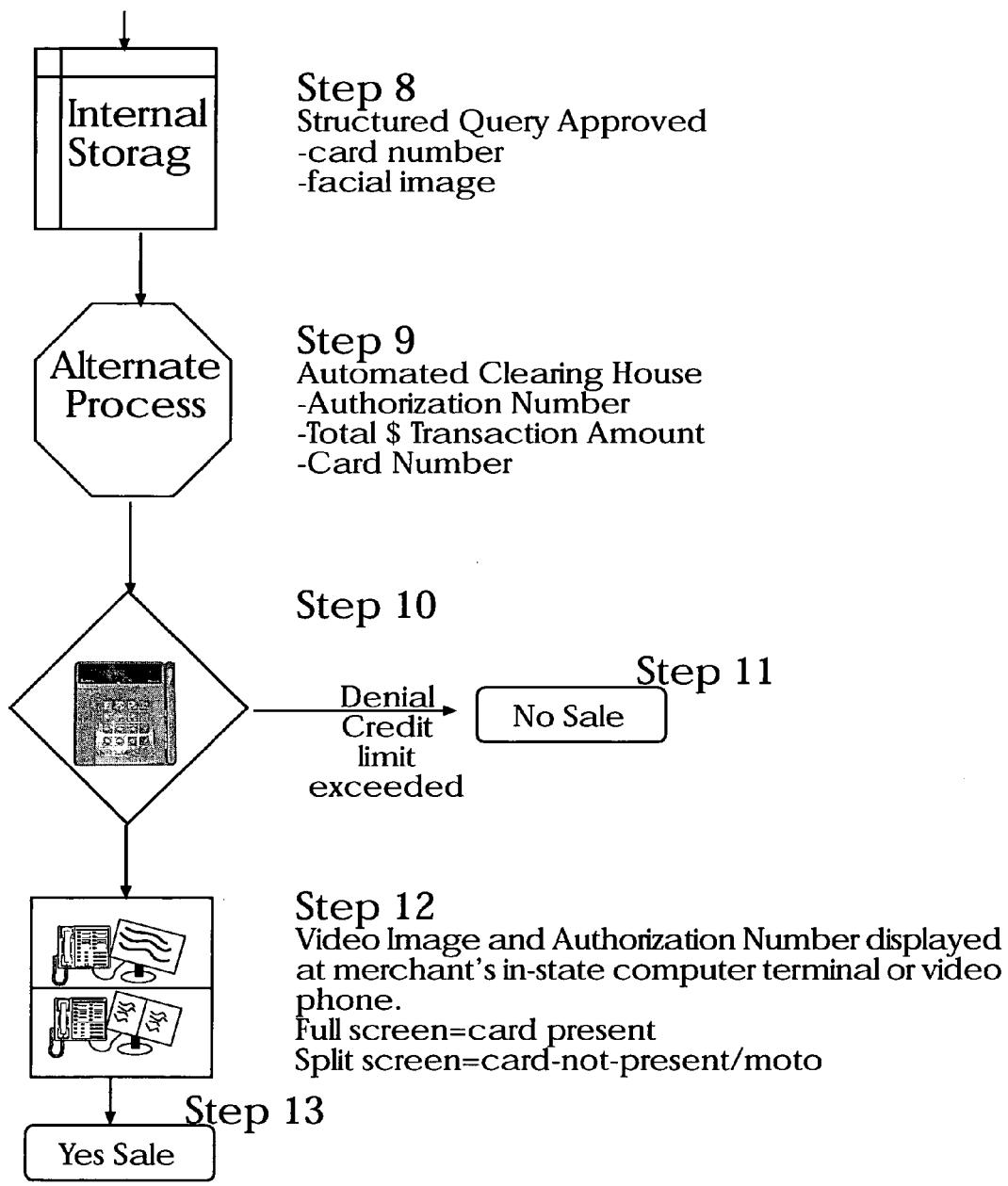
Figure 9D:
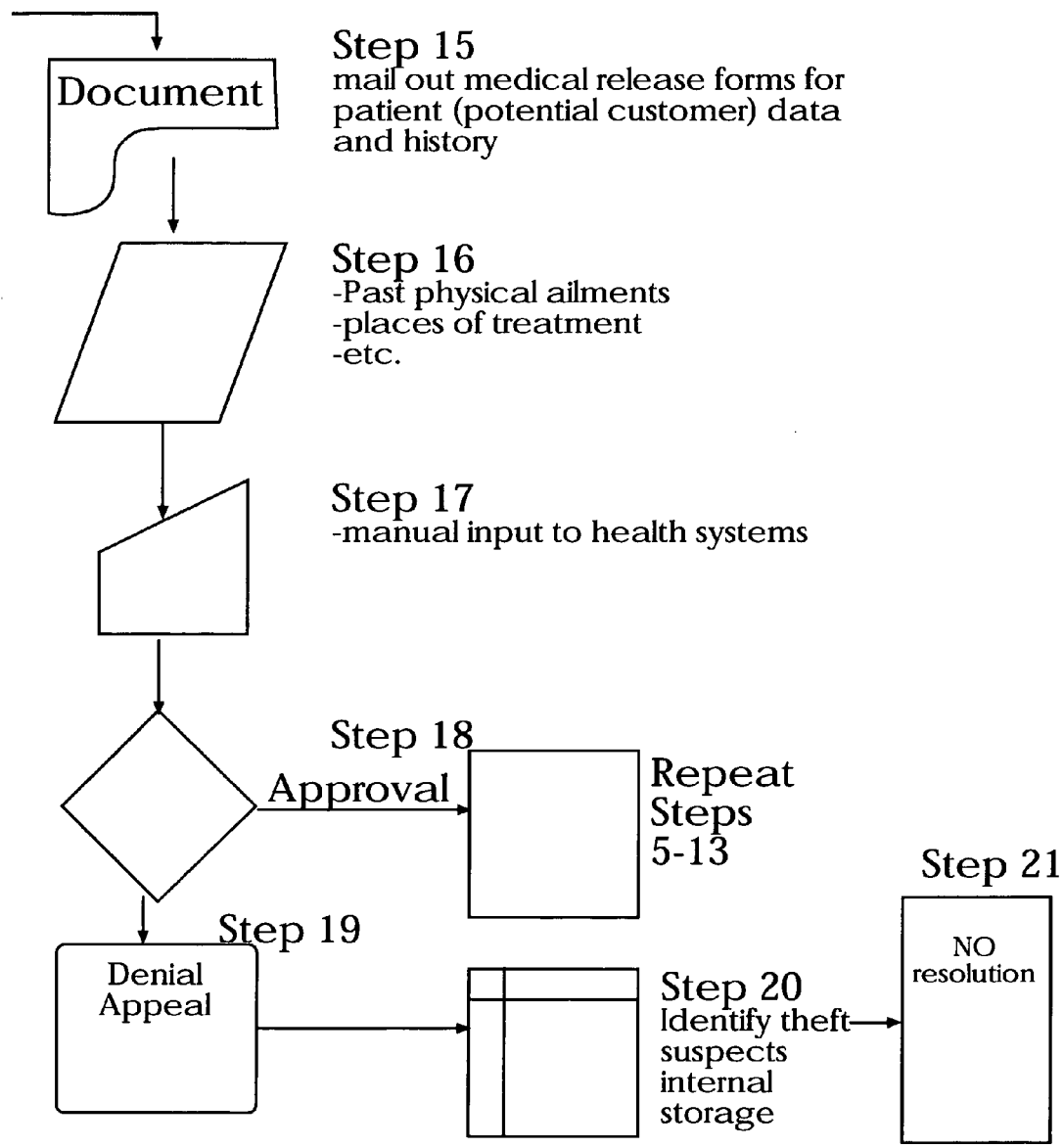

The present invention is a system and method to develop maintain, and use an authentic database of digital photographic images and unique textual data relating to individual's for positive identification. The system also includes a central database with load balancing and fault tolerant features. Various communication links will be disclosed between a merchant's magstripe terminal, card insertion machine, keyed input, manual imprint, or voice authorization, or other access device on the one hand through to the merchant's in-store computer server on the other hand and culminating to said system by way of (A) a DSL modem, or (B) a second telephone number and telephone line, or (C) a dual dial modem, or (D) two daisy chained modems where at least one is the magstripe terminal, or (E) an RJ-11 splitter/converter or other approximate concurrent communication links. A-E allows for a fast and efficient request and acknowledgements to display both (i) an authorization number supplied by a card authority from the merchant's bank and automated clearing house, and (ii) a pre-authenticated digital video static or dynamic photographic image for display whereas both will be concurrently displayed at the point of sale (POS). Said system will also disclose the backend process for pre-authentication of individual card holders.

The front end will disclose video and image capturing as well as describe the maturation process to visualize the fruits of the display.

The Back End

A distinction is now made between (A) card present and (B) card not-present transactions at a POS also known as mail order/telephone order (MOTO) and (C) other merchant's who extend goods or services based on a card holder's verifiable credit history. Each transaction will be disclosed. It should also be apparent that as we move from A through to B and then to C that the requirement for speed at the merchant's site is reduced. Hardware links between the merchant's magstripe reader, in-store computer server, and said system for card present and MOTO transactions are discussed below. Referring to the figures a 1 DSL or 2 cable modem link is established between the merchant's in-store computer server and said SAN database servers by way of a dial-up connection.

In the alternative a 3 second telephone number and telephone line may be set up between the merchant's in-store computer server and said SAN database servers by way of a dual modem. In the alternative a 4 dual dial modem may be set up and is comprised of two "modem to computer" ports along with one "line" and one "phone" port. The current invention calls for a disconnection between the magstripe reader and the wall phone jack and then placing that RJ-11 into the "modem to computer" port number one. Secondly place a separate telephone wire between port two of the "modem to computer" port on one end and connect the other end to the merchant's in-store computer server's modem. Complete the connections by adding yet another separate telephone wire between the "line" port and the wall jack. Next boot up the merchant's in-house computer server and configure the card authority's dial-up on port one and the SAN's database servers dial up on port two. The merchant's cash register and display device will perform a software driven request to the merchant's in house computer server for a video image through to the dual dial modem. Disable all call waiting configurations so incoming calls do not interrupt connections and specify tone dialing.

In the alternative 5 daisy chain three external or internal modems whereas at least one is the magstripe reader and the other two are merely a one port modem. Connect the magstripe "in" telephone port to the inhouse server modem's "out" port. Next, plug the magstripe's "out" telephone wire into the second modem's line "in" port. Next plug the last modem's line "out" into the wall jack. Boot up the merchant's in-house computer server and configure the card authority's dial-up from port one and the San's database servers dial up from port two. Disable all call waiting configurations so incoming calls do not interrupt connections then specify tone dialing.

In the alternative a 6 second telephone line is required from the telco. First crimp a wire with only the required inner Red (R) and Green (G) wires on both ends of the wire with an RJ-11 connector. Secondly crimp a wire with the second line comprised of the outer Black (B) and Yellow (Y) wires also with a RJ-11 connector on either end. Next plug the R & G wires into the magstrip reader on one end and take the other end and plug that into L1 of the 3 port prior art converter/splitter. Next plug the B & Y wires into the merchant's in-store computer server's modem on one end and take the other end and plug that into L2 of the 3 port prior art converter/splitter.

Finally, plug a four wire RJ-11 into the wall jack on one end and take the other end and plug that into the final port of the 3 port converter/splitter labeled L1+L2. Next boot up the merchant's in-house computer server and configure the card authority's dial-up from port one and the SAN's database servers dial up from port two. Disable all call waiting configurations so incoming calls do not interrupt connections then specify tone dialing. The magstripe reader will perform a dedicated dial up on the R&G wires and the merchant's in-house computer server's modem will perform a concurrent dial up on the B&Y wires to said system. Both requests will be returned along L1+L2 and then be passed on for display at the POS merchant's counter after the pre-authentication process.

All 7 card not present transactions will implement a simple internet connection between the merchant's in house computer server and said SAN database servers by way of an IP address.

The pre-authentication process 8 begins once a card holder inputs their video image and sensitive data (step 2) on the front end to a pre-holding area database server. The video image and sensitive data lie dormant in a common graphical user interface (CGI) bin or other information capturing software that is interoperable with a web-based, telephone, or telephony interface. The same holds true for received postal mail, courier, and facsimile sensitive data. Then the video image and sensitive data is timed to dump onto a staging area. After the dump, various dedicated servers to a multitude of public, private, and internal databases are queried. These (step 3) various dedicated servers all perform "in-computer" activity and have high speed connections and are software driven by a structured query interface performing searches involving abstract objects based on the selected fields extrapolated from the sensitive data. Specifically the name and address field will perform the most searches on each public or private database on the one hand. On the other extreme a bank identification number (BIN) search to match the card issuer will be performed to ensure that the account issuer is authentic. The pre-authentication process back-end (step 3) databases will consist of, but not be limited to include record searches at the state motor vehicle departments, public records searches, Seisint Inc.'s Matrix database, National Court records, Nationwide criminal records checks, Statewide criminal records searches, State and Federal inmate locator databases, Death Row records portioned by state, The black book on line professional investigator's web sites, POW searches, Federal Government and National database links, Information searches meg-a-list, vital records information, webgator, Military records, Military searches and locator, Cemeteries and obituaries, FOIA requests, DEA, FBI file requests, transactions records, Access clearinghouse, Internal revenue, Department of Justice, People locator, Reverse telephone directory, Anywho.com, Area code look-up, free yellow and white pages, infousa.com., World telephone directory, map quest, Foreign governments, Foreign embassies, Lexis-Nexis, and various search engines.

Collision Process

Presupposing, after the above rather exhausted automatic and software driven process on the sensitive data poses no collisions (step 4), then the next step will consist of running a facial recognition software driven program (step 3) on the video image that will detect and identify duplicate key pixels of existing card holders against new card holders seeking authentication and credit history protection. Whereas the facial recognition server will be built and maintained and run during the backend authentication process.

If a collision takes place derived from an image (step 4) or derived from the submitted sensitive data then a hold on both accounts goes into immediate effect (step 14), upon which time a manual process ensues whereupon a (step 15) medical patient release request is forwarded to the two individuals claiming the visage. The request will be either online through the systems secure website, electronic mail, or via hard copy over the postal mail, facsimile, or in the case of visually challenged or otherwise challenged individuals then the back-end collision process will support a video-telephone submission of the patient release and request information. Requested information will consist of (step 16) unique health related questions. Examples might include: where is your birthmark? What is the name of your attending physician? Where does that person practice medicine? What disabilities do you currently suffer from that may not been seen by the naked eye? E.g. high blood pressure, diabetes, sickle-cell, gland irregularities, and a host of others as the need arises. The intent is to obtain objective verifiable unique medical data that will (1) correspond to the card holders information similar to a mortgage assets and liabilities application that is later verified by an objective financial institution, and (2) most importantly—weed out the imposter. Once this manual process takes place and is satisfactory to the SAN database server's agent, then the (step 18) satisfactory data and image is approved and manually input into a health systems database that will be built and maintained and incorporated into the various internal database servers locations. That satisfactory data is then routed for (steps 5-13) random downloads onto the storage area network (SAN) database permanent server. The unsatisfactory data and image is routed to a server database labeled "suspected identity imposters", or similar, where upon that internal server will be built and maintained and be incorporated into the authentication process similar to the public, private, and facial recognition matching database searches.

Finally, (step 19) an appeal process will ensue and be forwarded to the unsatisfactory data and image suspect that may result in (step 21) no resolution.

The public, private, and internal databases as well as the facial recognition matching software will all be virtual, that is to say it will run 24 hours a day, 7 days a week. The pre-authentication process will not be connected to the permanent SAN network until random timed downloads are configured only. This will free up processor time during on-peak times in the SAN as well as allow for time outs for security reasons and reduce hacker attacks from the internet to the permanent SAN database servers.

The Front End

Video images are captured via web camera, digital camera, camera phone, picture messaging, internet protocol camera, watch camera, or any other digital photographic capturing equipment other than CMOS scanners at the POS. The images are then transmitted via the internet or other medium and downloaded on to a staging area for visage comparisons.

Sensitive data is captured via a secure internet website, postal mail, or courier, facsimile, telephone, telephony, or any other communication means other than at the POS for new customers as well as for editing functions. A positive identification system in accordance with the disclosed invention is shown. A point of a merchant's display device at a in-store cash register is located at a merchant's site. The point of a merchant's display device at a in-store cash register is connected to one or more of seven types of magnetic stripe readers consisting of a card authorization terminal only, a terminal and printer, a terminal, printer, and personal identification number (PIN) pad, mobile card terminal, card authorization software for IBM or IBM compatible or Macintosh systems (or flashcard), Internet card processing software (or flashcard), or PIN pad only, or a combination of any of the foregoing all of which are well known in the art. A display means consisting of a monochrome display adapters (MDA), Hercules Graphics cards (HGC), Color graphics adapter (CGA), Enhanced Graphic Adapters (EGA), Video Graphics Array (VGA), or super and ultimate VGA (SVGA), light emitting diode (LED), Liquid crystal display (LCD), High definition television (HDTV), or plasma display capabilities.

In a card present transaction, the primary or secondary card holder is present at the merchant's site. In a multi-use, oil/department store, retail store, or travel and entertainment card transaction or other magnetic stripped or smart card transactions, herein referred to as a card transaction to incorporate both credit and debit transactions, the point of identification would be the POS, which typically incorporates a cash register, a display output device, and prior art credit card authorization systems previously mentioned. Upon presentation of a standard card transaction the merchant or merchant's agent would instruct the cardholder to swipe or insert the card in the card reader or in the alternative perform the swipe or insertion act on behalf of the card holder. The merchant's agent may also opt to perform a voice authorization by in each instance keying the card account number into the device. The card reader would then typically read tracks one and two as is incorporated in the prior art and would then initiate communication concurrently to (1) the card approving authority or clearinghouse to determine if funds were available as it relates to the card holder's credit limit and (2) the SAN database servers embodied in this disclosure that performs a pre-authenticated back-end process and then at some point in the future and upon request by the merchant or their agent will display a digital photographic image in either static or dynamic format whereas both 1 and 2 will be displayed simultaneously approximately followed by a unique and ubiquitous audio signal.

The data and video is transmitted in frames that contain synch characters before each frame. The receive buffers at the merchant's site will be configured to modify connection problems to enhance speed and performance.

Referring to the figures, once a request by the merchant is transmitted across the 1 DSL or 2 cable modem, 3 second telephone number and line, 4 dual-dial modem, 5 two daisy chained modems where at least one is the merchant's magstripe reader, or 6 an RJ-11 converter/splitter to the system's database storage central location, then an acknowledgement takes place to complete the link from the SAN database's modem to the merchant's server, by quickly and efficiently evaluating the point of origin of the request via the merchant's identification code universally supplied by the merchant's acquirer. This code is consistent with the practices in the art and is distinguished from the prior art that employs a caller id methodology. The current invention considers that merchant's telephone numbers change, as well as area codes, as well as blocking features against caller id. Remedying that, then once the database verifies that the request is from a valid merchant, then the request is routed to a storage area network (SAN). The SAN network design and implementation will include firewalls made of hardware and software configurations to stave off would be hackers.

It will also create and maintain event logs to monitor network attacks. Particular attention will be paid to configuring incoming requests on well-know or reserved protocol port numbers as well as outgoing video and sensitive data on registered or private protocol port numbers for security purposes. The request will be routed to the appropriate storage server after a software driven structured query takes place. The query will be based on the pre-stored authenticated non-checking account number as well as a digital photographic video image both located in the SAN database. The account number may serve as the primary key and the image as the foreign key. The merchant's id code as well as the total transaction amount will be captured at the point of entry into the system and will forward the request to the SAN over a high speed network medium. The high speed network may be fiber optic, category 5, 100 Base TX, 1000 Base TX, or Gigabit Ethernet for fast transmissions inside the SAN. Those experienced in the art are familiar with these mediums. The SAN databases will implement a (redundant array of inexpensive disk) RAID 30 striping with parity configuration at the block level for images and not at the byte level. This will ensure high video and data transfer rates and redundancy. Raid 30 also allows for 6-32 maximum drives and is highly fault tolerant. The selected server then retrieves the digital image keyed from the structured query as well as other unique questions and answers or textual data associated with the image inside the database server. The point of the merchant's output display device would then receive the image via the open session that is still established across the DSL or cable modem, second telephone number and line, dual-dial modem, two daisy chained modems where at least one is the merchant's magstripe reader, or an RJ-11 converter/splitter or WAN connection all in a full duplex environment and then display the digital image received along with the textual image. The display output configuration will be software driven in that the text will appear below the image during a card present transaction. In another aspect, during a card-not present transaction, the same above steps will transpire during the MOTO transaction. The difference is that the display on the merchant's site will consist of either a in-store computer and display that would require a customer on one end to be connected to the merchant via a internet protocol camera, or a web camera or video telephone or any other real time digital photographic dynamic image capturing and transmitting technology. Once that capability is in place on the card holder's end, then the merchant will once again perform a card authorization process by keying in the card account number into the PIN Pad device. The PIN Pad would then initiate communication concurrently to (1) the card approving authority to determine if funds were available as it relates to the card holder's credit limit and (2) the system embodied in this disclosure that performs a pre-authenticated back-end process and then at some point in the future and upon request by the merchant or their agent will display a digital photographic image in either static or dynamic format whereas both 1 and 2 will be displayed simultaneously approximately followed by a unique and ubiquitous audio signal.

The merchant's display will be a computer and monitor and/or a video telephone whereupon the screen will split. One side would include the dynamic image in real time of the card holder on the telephone and the other side would include the static or dynamic image of the pre-stored authenticated digital photographic image of the card holder transmitted from the SAN database servers embodied in this disclosure. The merchant or their agent may then opt to instruct the card holder on the real time side to voluntarily touch their left eye brow with their right index finger or any combination of other verifiable means that would satisfy the merchant to ensure that the card holder was in real time and was not under duress during the transaction. At that point a visual comparison could be made between the real time image and the pre-authenticated image.

In the alternative, during a transaction consisting of other merchants who extend goods or services based on a card holder's verifiable credit history as previously noted the need for speed is decreased significantly. The need for efficiency still remains high. As a result, merchants within this category consisting of but not limited to loan officers at financial institutions, telephone and utility companies opening new accounts, Government documents and Benefits agencies, as well as Medical, Insurance, and Securities enterprises, and countless others would simply log on via a VPN dedicated modem or secure internet access to the SAN database servers to access and gain verifiable video authentication as their needs arise.

Once the images and textual data requests are transmitted to these merchant's, then a session is ended and a port is closed on that specific request. The merchant's id, date, time and transaction amount or fixed expense is captured at the point of entry and are collected and maintained for billing purposes to be electronically transmitted out to the merchant's acquiring bank at the end of each business day.

What is claimed is:

1. A process for preventing identity theft from occurring when an imposter attempts to use a non-checking account number in a transaction with a merchant at a point of sale, the process comprising the steps of:

performing a pre-authentication process on authentication server, the pre-authentication process authenticating that an individual is the account holder of an identified account the pre-authentication process comprising:

providing the authentication server with a facial image and personally identifiable information of the individual, wherein the personally identifiable information is textual data, the authentication server autonomously authenticating the personally identifiable information of the individual by performing a structured query on public, private, and internal database servers and comparing the textual data of the personally identifiable information of the individual with corresponding textual data of the personally identifiable information stored in the public, private, and internal database servers, the authentication server autonomously authenticating the facial image of the individual by performing facial recognition on an internal database server and comparing key pixel data of the facial image of the individual with corresponding key pixel data of the facial images stored in the internal database server, wherein the individual is authenticated as the account holder if the personally identifiable information structured query and the facial recognition process do not find conflicting data;

storing the authenticated facial image and the authenticated personally identifiable information of the authenticated account holder in an approved database associated with the authentication server;

receiving a request transmitted by a merchant computer, associated with the merchant, regarding use of the non-checking account number by a customer at the point of sale, wherein the request includes the non-checking account number;

matching the non-checking account number included in the request to the identified account of the authenticated account holder in the approved database;

retrieving the authenticated facial image of the authenticated account holder from the approved database; and transmitting a message that includes the retrieved authenticated facial image over the Internet to the merchant computer that displays the facial image at the merchant computer at the point of sale for image comparison purposes with the customer alleging to be the authenticated account holder prior to completion of the transaction.

2. The process as set forth in claim 1, wherein the providing step is performed at an earlier point in time than the receiving step.

3. The process as set forth in claim 2, wherein the providing step is not performed at the point of sale.

4. The process as set forth in claim 2, wherein the authenticating steps and the storing step are performed at an earlier point of time than the receiving step.

5. The process as set forth in claim 1, wherein the querying steps comprise performing structured searches involving selective fields in the databases and the provided personally identifiable information of the individual.

6. The process as set forth in claim 5, wherein the selective fields comprise a name field and an address field.

7. The process as set forth in claim 1 further comprising the step of not authenticating the individual as the account holder of the identified account if the query or facial recognition steps identify a conflict.

8. The process as set forth in claim 7, further comprising the step of providing the authentication server with objective verifiable unique medical data about the-individual and using this medical data to determine if the individual is the account holder or an imposter.

9. The process as set forth in claim 1, further comprising the steps of:

retrieving a non-checking account number of a consumer alleging to be the authenticated account holder, communicating the consumer's non-checking account number from the merchant server to the authentication server, receiving, from the authentication server, the stored authenticated facial image of the authenticated account holder;

displaying the authenticated facial image of the authenticated account holder on a display screen at the point of sale; and comparing the displayed authenticated facial image of the authenticated account holder and the facial image of the consumer alleging to be the account holder to determine whether the consumer is the authenticated account holder or an imposter.

10. The process as set forth in claim 9, wherein the consumer is present at the point of sale, and wherein said account-number-retrieving step is performed by a card reader at the point of sale reading a card of the consumer.

11. The process as set forth in claim 10, wherein the comparing step comprises an agent of the merchant looking at the facial image of the consumer and comparing it to the retrieved authenticated facial image received from the authentication server.

12. The process as set forth in claim 9, wherein the consumer is present at the point of sale and wherein the comparing step comprises an agent of the merchant looking at the facial image of the consumer and comparing it to the retrieved authenticated facial image received from the authentication server.

13. A process as set forth in claim 9, wherein the consumer is not present at the point of sale, and wherein said account-number-retrieving step comprises the consumer communicating to an agent of the merchant.

14. A process as set forth in claim 13, wherein said providing step comprises an agent of the merchant inputting the card information into the merchant server.

15. A process as set forth in claim 13, further comprising the step of capturing a facial image of the consumer and transferring this captured facial image over the Internet to the merchant server using real time digital photographic dynamic image capturing and transmitting technology, and wherein said comparing step comprises an agent of the merchant looking at the transferred facial image and comparing it to the facial image received from the authenticating server.

16. A process as set forth in claim 13, further comprising the step of capturing a real time facial image of the consumer, and wherein said comparing step comprises an agent of the merchant looking at the real time facial image and comparing it to the retrieved facial image received from the authenticating server.

17. A process as set forth in claim 16, wherein said displaying step comprises a split screen wherein one side includes the real time facial image and one side includes the retrieved facial image.

18. The process as set forth in claim 1, wherein the step of authenticating the facial image of the individual further comprises querying public and private database servers and comparing the facial image of the individual with corresponding facial images stored in the public and private database servers.

* * * * *